United States Patent
Miura

(10) Patent No.: US 9,756,111 B2
(45) Date of Patent: Sep. 5, 2017

(54) INFORMATION PROCESSING APPARATUS, SYSTEM, INFORMATION PROCESSING METHOD, AND NON-TRANSITORY COMPUTER READABLE MEDIUM

(71) Applicant: FUJI XEROX CO., LTD, Minato-ku, Tokyo (JP)

(72) Inventor: Toru Miura, Yokohama (JP)

(73) Assignee: FUJI XEROX CO., LTD, Minato-ku, Tokyo (JP)

( * ) Notice: Subject to any disclaimer, the term of this patent is extended or adjusted under 35 U.S.C. 154(b) by 270 days.

(21) Appl. No.: 14/542,153

(22) Filed: Nov. 14, 2014

(65) Prior Publication Data

US 2015/0334049 A1 Nov. 19, 2015

(30) Foreign Application Priority Data

May 16, 2014 (JP) ................................ 2014-102283

(51) Int. Cl.
| | | |
|---|---|---|
| G06F 15/16 | (2006.01) | |
| H04L 29/08 | (2006.01) | |
| H04L 12/927 | (2013.01) | |
| H04L 29/06 | (2006.01) | |
| H04L 12/947 | (2013.01) | |

(52) U.S. Cl.
CPC ............ *H04L 67/02* (2013.01); *H04L 47/808* (2013.01); *H04L 49/25* (2013.01); *H04L 63/0807* (2013.01); *H04L 67/42* (2013.01); H04L 67/2804 (2013.01)

(58) Field of Classification Search
None
See application file for complete search history.

(56) References Cited

U.S. PATENT DOCUMENTS

| | | | |
|---|---|---|---|
| 6,912,582 B2* | 6/2005 | Guo | ........................ H04L 63/08 709/203 |
| 8,683,565 B2* | 3/2014 | Backlund | .............. G06F 21/335 709/225 |

(Continued)

FOREIGN PATENT DOCUMENTS

| | | |
|---|---|---|
| JP | 2012-113701 A | 6/2012 |
| JP | 2012-118971 A | 6/2012 |

*Primary Examiner* — Umar Cheema
*Assistant Examiner* — Gregory P Tolchinsky
(74) *Attorney, Agent, or Firm* — Sughrue Mion, PLLC

(57) ABSTRACT

An information processing apparatus includes the following. A first transmission unit transmits a first response containing an identification value of the information processing apparatus to a client apparatus in response to a login request. A second transmission unit transmits, to the client apparatus, a second response to instruct the client apparatus to perform redirection to one of uniform resource locators preregistered in a server apparatus as access right transfer destinations if an access right transfer is authorized. A third transmission unit reads out region information contained in an access request received from the client apparatus in response to the second response if a uniform resource locator contained in the received access request is not the one associated with the information processing apparatus and transmits a third response containing an instruction for redirection to a uniform resource locator corresponding to the read out region information to the client apparatus.

11 Claims, 5 Drawing Sheets

(56) References Cited

U.S. PATENT DOCUMENTS

| | | | |
|---|---|---|---|
| 2004/0088438 A1* | 5/2004 | Madril, Jr. | H04L 63/08 709/250 |
| 2005/0204041 A1* | 9/2005 | Blinn | H04L 63/0815 709/225 |
| 2012/0102219 A1* | 4/2012 | Speckbacher | H04L 29/12066 709/238 |
| 2012/0113471 A1 | 5/2012 | Shimada et al. | |
| 2014/0230023 A1* | 8/2014 | Parks | G06F 21/41 726/4 |

* cited by examiner

INFORMATION PROCESSING APPARATUS, SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-102283 filed May 16, 2014.

BACKGROUND (i) Technical Field

The present invention relates to an information processing apparatus, a system, an information processing method, and a non-transitory computer readable medium.

(ii) Related Art

There are techniques that enable access to a server apparatus via a relay apparatus when the server apparatus on a network is utilized.

SUMMARY

According to an aspect of the invention, there is provided an information processing apparatus including a first transmission unit, a second transmission unit, and a third transmission unit. The first transmission unit transmits a first response to a client apparatus in a case where the information processing apparatus receives a login request to log into the information processing apparatus from the client apparatus. The first response contains information identifying the information processing apparatus. The second transmission unit transmits, to the client apparatus, a second response to instruct the client apparatus to perform redirection to a uniform resource locator among one or plural uniform resource locators that are preregistered in a server apparatus as destinations to which an access right is to be transferred, in a case where the server apparatus authorizes a transfer of the access right in response to a request from the client apparatus. The third transmission unit reads out region information contained in an access request received from the client apparatus in response to the second response in a case where a uniform resource locator of a redirection destination contained in the received access request is not a uniform resource locator associated with the information processing apparatus and transmits a third response containing an instruction for redirection to a uniform resource locator corresponding to the read out region information to the client apparatus which is a transmission source of the received access request.

BRIEF DESCRIPTION OF THE DRAWINGS

An exemplary embodiment of the present invention will be described in detail based on the following figures, wherein.

DETAILED DESCRIPTION

1. Configurations

Figure 1:
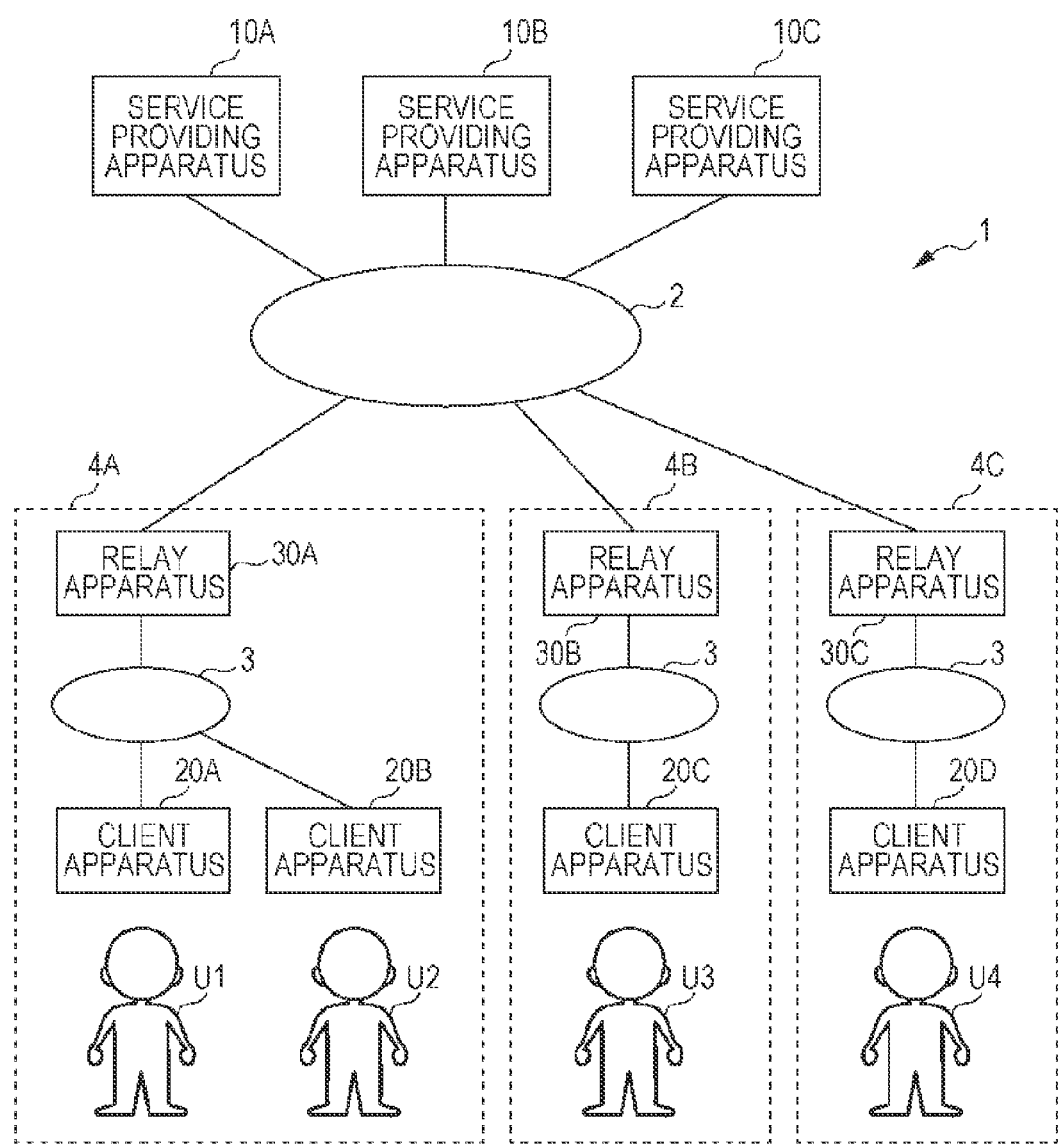
FIG. 1 illustrates the overall configuration of a system according to an exemplary embodiment.

FIG. 1 illustrates the overall configuration of a system 1 according to an exemplary embodiment. The system 1 includes service providing apparatuses 10A, 10B, and 10C; client apparatuses 20A, 20B, 20C, and 20D; and relay apparatuses 30A, 30B, and 30C. Hereinafter, the service providing apparatuses 10A, 10B, and 10C are collectively referred to as "service providing apparatuses 10" unless distinction between them is required. Also, the client apparatuses 20A, 20B, 20C, and 20D are collectively referred to as "client apparatuses 20" unless distinction between them is required. The relay apparatuses 30A, 30B, and 30C are collectively referred to as "relay apparatuses 30" unless distinction between them is required. The service providing apparatuses 10 and the relay apparatuses 30 are connected to one another via a communication network 2, such as the Internet. The client apparatuses 20 and the relay apparatuses 30 are connected to the communication network 2 via a communication network 3, such as the Internet or a local area network (LAN). Alternatively, the client apparatuses 20 may be connected directly to the communication network 2 not via the communication network 3 and the relay apparatuses 30.

Each of the service providing apparatuses 10 provides various services, such as a service for storing data. These services may be so-called cloud services. Each of the client apparatuses 20 may be, for example, an image processing apparatus and is used when a user utilizes services provided by the service providing apparatus 10. The client apparatus 20 may have multiple functions, such as a scan function, a copy function, a print function, and a facsimile function. Each of the relay apparatuses 30 has a function for relaying data exchange between the client apparatus 20 and the service providing apparatus 10.

In this example, locations at which the client apparatuses 20 are placed are classified into multiple regions 4A, 4B, and 4C. The relay apparatus 30A relays data exchange between the service providing apparatuses 10 and the client apparatuses 20A and 20B located in the region 4A. The relay apparatus 30B relays data exchange between the service providing apparatuses 10 and the client apparatus 20C located in the region 4B. The relay apparatus 30C relays data exchange between the service providing apparatus 10 and the client apparatus 20D located in the region 4C. Hereinafter, the regions 4A, 4B, and 4C are collectively referred to as "regions 4" unless distinction between them is required.

Each user of the system 1 belongs to one of the regions 4. Hereinafter, for convenience of explanation, the region 4 to which a user belongs is called a "home region" of the user, whereas regions to which the user does not belong are called "away regions". In this example, the region 4A is a home region for users U1 and U2, whereas the regions 4B and 4C are away regions for the users U1 and U2. Usually, each user performs various operations by using the client apparatus 20 located in the region 4 to which the user belongs. Information regarding users (i.e., user information), such as users' account information, is registered in the relay apparatus 30 for the region 4 to which individual users belong. The relay apparatus 30 performs processes, such as user authentication, on the basis of the user information registered therein.

Hereinafter, the users U1, U2, U3, and U4 are collectively referred to as "users U" unless distinction between them is required.

Figure 2:
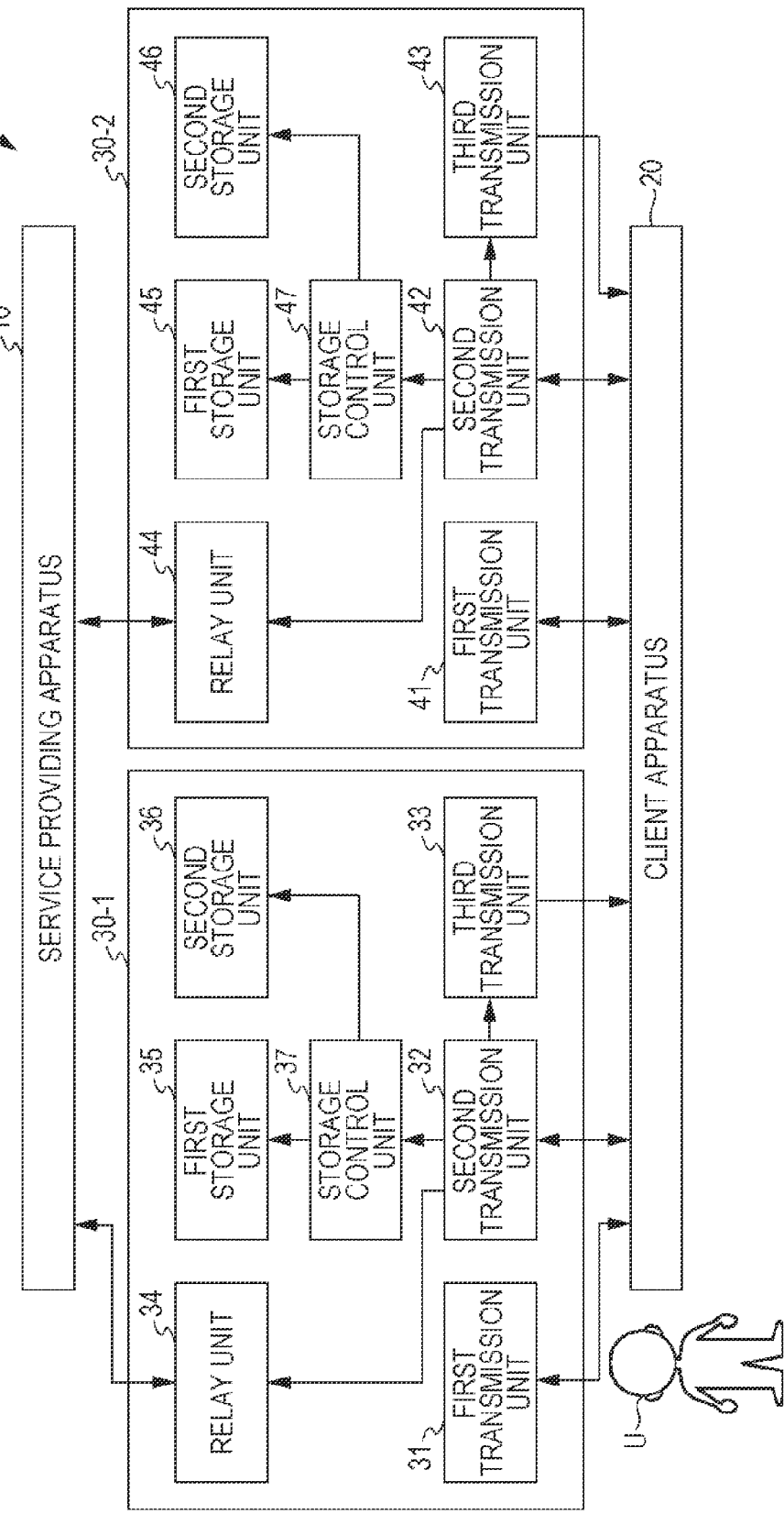
FIG. 2 illustrates a functional configuration of the system.

FIG. 2 illustrates a functional configuration of the system 1. The system 1 includes the service providing apparatus 10, the client apparatus 20, and relay apparatuses 30-1 and 30-2. The relay apparatus 30-1 is an example of a first information processing apparatus, whereas the relay apparatus 30-2 is an example of a second information processing apparatus. The relay apparatus 30-1 includes a first transmission unit 31, a second transmission unit 32, a third transmission unit 33, a relay unit 34, a first storage unit 35, a second storage unit 36, and a storage control unit 37.

Upon receipt of a login request to log into the relay apparatus 30-1 from the client apparatus 20, the first transmission unit 31 transmits to the client apparatus 20 a first response which is a response to the login request. The first response contains an identification value of the relay apparatus 30-1 in a predetermined area of a header of the first response.

The second transmission unit 32 receives an access request to access the service providing apparatus 10 from the client apparatus 20. In this example, one or multiple uniform resource locators (URLs) which indicate destinations to which the access right is to be transferred are preregistered in the service providing apparatus 10. The service providing apparatus 10 transmits, to the relay apparatus 30-1, information to instruct the client apparatus 20 to perform redirection to a preregistered URL in the case where it authorizes a transfer of the access right. The second transmission unit 32 of the relay apparatus 30-1 transmits this information as a second response to the client apparatus 20.

In the case where a URL of a redirection destination contained in an access request received from the client apparatus 20 is not a URL uniquely assigned to a resource of the relay apparatus 30-1, the third transmission unit 33 reads out a value set in a predetermined area of the header of the access request. The third transmission unit 33 also transmits a third response which instructs the client apparatus 20 to perform redirection to a URL corresponding to the read out value, to the client apparatus 20 which is the transmission source of the received access request.

In the case where a URL of a redirection destination contained in an access request received from the client apparatus 20 is a URL uniquely assigned to a resource of the relay apparatus 30-1, the relay unit 34 relays access to the service providing apparatus 10 by using right information contained in the received access request.

The first storage unit 35, which is an example of a first memory, is a storage unit that stores data. Data stored in the first storage unit 35 is copied to a resource of another relay apparatus 30. The second storage unit 36, which is an example of a second memory, is a storage unit that stores data. The storage control unit 37, which is an example of a memory controller, controls storage of first right information contained in an access request received by the second transmission unit 32 in the first storage unit 35 and storage of second right information contained in the received access request in the second storage unit 36.

The relay apparatus 30-2 includes a first transmission unit 41, a second transmission unit 42, a third transmission unit 43, a relay unit 44, a first storage unit 45, a second storage unit 46, and a storage control unit 47. The first transmission unit 41, the second transmission unit 42, the third transmission unit 43, the relay unit 44, the first storage unit 45, the second storage unit 46, and the storage control unit 47 have configurations similar to those of the first transmission unit 31, the second transmission unit 32, the third transmission unit 33, the relay unit 34, the first storage unit 35, the second storage unit 36, and the storage control unit 37 of the relay apparatus 30-1, respectively.

Figure 3:
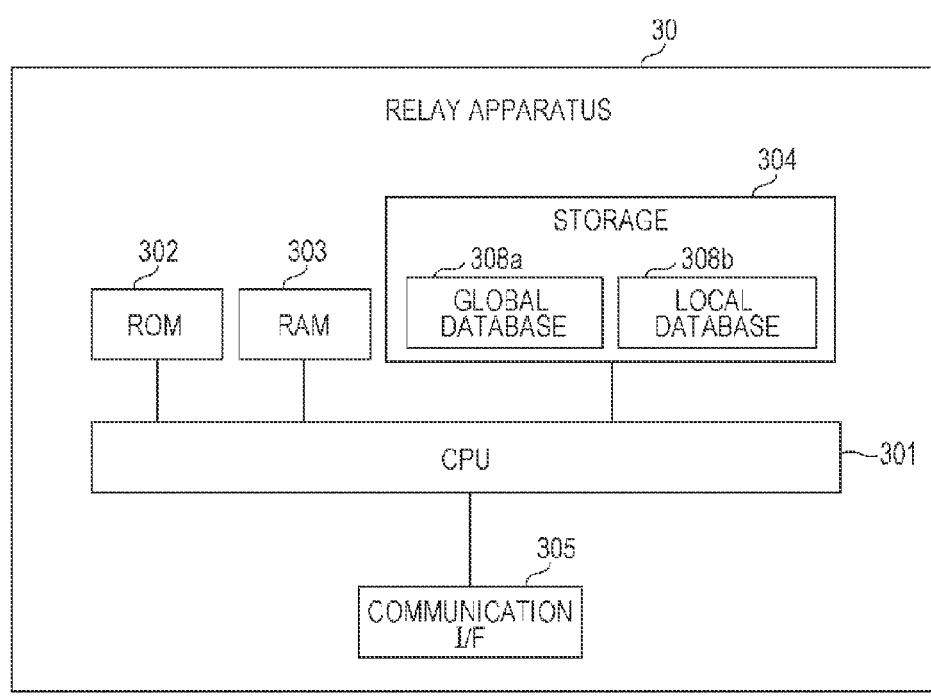
FIG. 3 illustrates a hardware configuration of a relay apparatus.

FIG. 3 illustrates a hardware configuration of the relay apparatus 30. The relay apparatus 30 is, for example, a computer apparatus including a central processing unit (CPU) 301, a read only memory (ROM) 302, a random access memory (RAM) 303, a storage 304, a communication interface (I/F) 305. The CPU 301 is a control device (processor) that controls each component of the relay apparatus 30. The ROM 302 is a nonvolatile memory device that stores programs and data. The RAM 303 is a volatile main memory device that functions as a work area when the CPU 301 executes a program. The storage 304 is a nonvolatile auxiliary storage device that stores programs and data. The communication I/F 305 is an interface used to perform communication via the communication network 2, and is, particularly in this example, an interface enabling communication between the service providing apparatus 10 and the client apparatus 20.

The storage 304 includes a global database 308a and a local database 308b. The global database 308a is a database that stores data shared by the multiple relay apparatuses 30. The local database 308b is a database that stores data referred to by this relay apparatus 30. The data stored in the global database 308a is copied to the other relay apparatuses 30 at predetermined timings (e.g., at regular timings or timings at which the global database 308a is updated). In contrast, the data stored in the local database 308b is not copied to the other relay apparatuses 30. The global database 308a is an example of the first storage unit 35 and the first storage unit 45. The local database 308b is an example of the second storage unit 36 and the second storage unit 46. Hereinafter, the global database 308a and the local database 308b are collectively referred to as "databases 308" unless distinction between them is required.

In this example, the functions illustrated in FIG. 2 are implemented as a result of the CPU 301 executing a relay program stored in the storage 304 (or the ROM 302). The CPU 301 or the CPU 301 and the communication I/F 305 that execute the relay program are an example of the first transmission unit 31, the second transmission unit 32, the third transmission unit 33, the relay unit 34, the first transmission unit 41, the second transmission unit 42, the third transmission unit 43, and the relay unit 44.

A detailed description regarding hardware configurations of the service providing apparatus 10 and the client apparatus 20 will be omitted. The service providing apparatus 10 is, for example, a computer apparatus including a CPU, a ROM, a RAM, a storage, and a communication I/F. The client apparatus 20 is, for example, an image forming apparatus including a CPU, a ROM, a RAM, a storage, an operation unit, a display unit, an image scanning unit, and an image forming unit.

2. Operations 2-1. First Exemplary Operation

Figure 4:
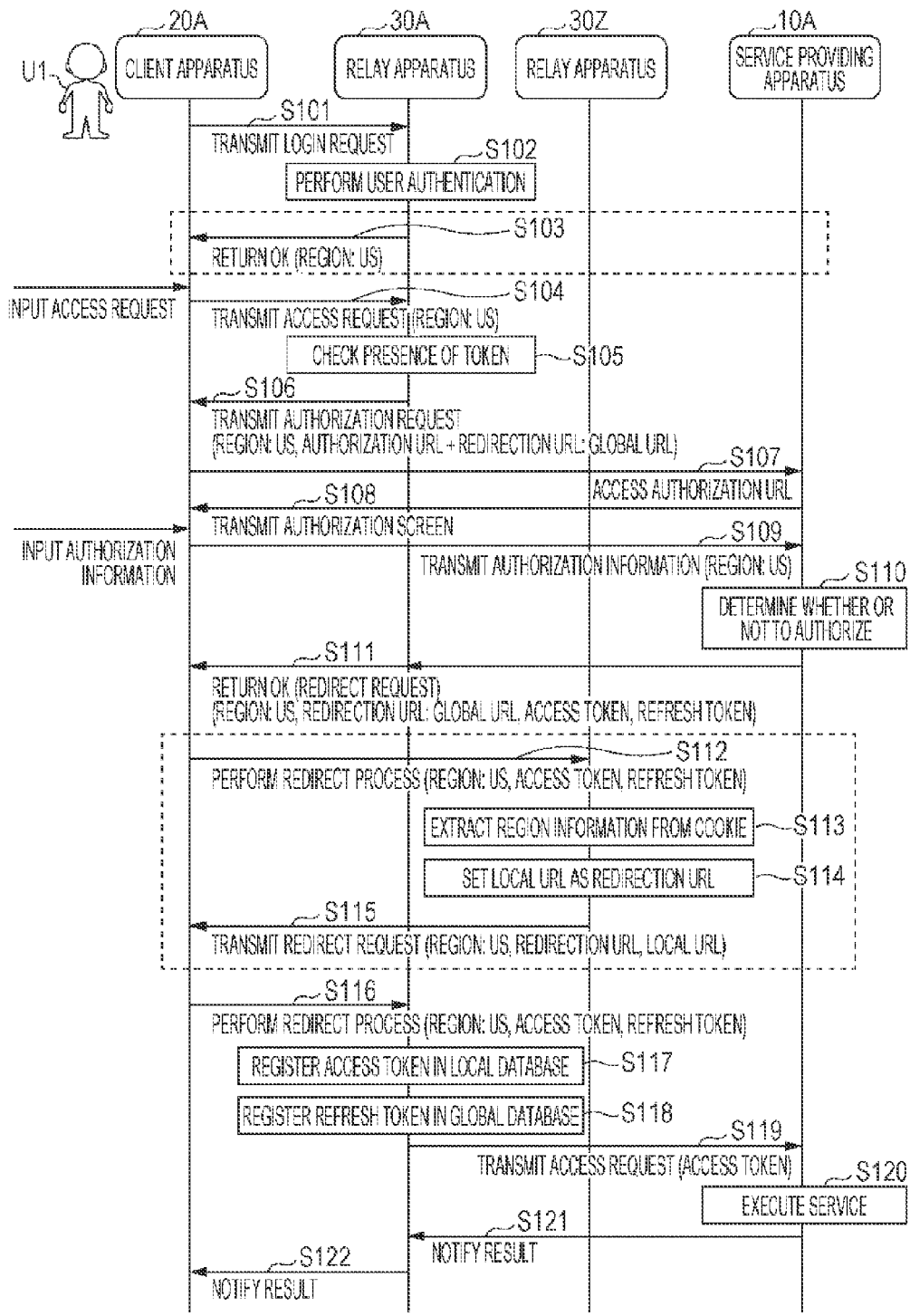
FIG. 4 is a sequence diagram illustrating an operation performed by the system.

FIG. 4 is a sequence diagram illustrating an operation performed by the system 1. This example illustrates an operation performed in the case where the user U1 utilizes a service provided by the service providing apparatus 10A, by using the client apparatus 20A. In this example, the system 1 transfers the access right by using a predetermined protocol, for example, the OAuth2 protocol. That is, in the system 1, the OAuth2 protocol is used so that the access right to access the service providing apparatus 10A granted to the client apparatus 20A is transferred to the relay apparatus 30A and the relay apparatus 30A to which the access right has been transferred relays access of the client apparatus 20A to the service providing apparatus 10A. In the example illustrated in FIG. 4, the hypertext transfer protocol (HTTP) is used to exchange data between the apparatuses.

In this example, the relay apparatus 30A is assigned a URL "us.example.com", the relay apparatus 30B is assigned a URL "eu.example.com", and the relay apparatus 30C is assigned a URL "jp.example.com". The URL "us.example.com" is a URL uniquely assigned to a resource of the relay apparatus 30A. The URL "eu.example.com" is a URL uniquely assigned to a resource of the relay apparatus 30B. The URL "jp.example.com" is a URL uniquely assigned to a resource of the relay apparatus 30C. In addition, a URL "www.example.com" is used as a URL shared by the relay apparatuses 30A, 30B, and 30C (i.e., a single URL indicating the relay apparatuses 30A, 30B, and 30C). For convenience of explanation, the URL uniquely assigned to each of the relay apparatuses 30 is hereinafter referred to as a "region URL", whereas the URL shared by the multiple relay apparatuses 30 is hereinafter referred to as a "global URL".

First, the user U1 logs into the relay apparatus 30A by using the client apparatus 20A. Specifically, the user U1 inputs his/her account information (such as the user ID and the password) by operating the operation unit of the client apparatus 20A. For example, the user U1 inputs a user ID "user01" and a password "password01".

In step S101, the client apparatus 20A transmits, to the relay apparatus 30A, a login request (HTTP request) which contains the account information input through the operation by the user U1. In step S102, the CPU 301 of the relay apparatus 30A performs user authentication by using the account information contained in the received login request. The global database 308a stores data regarding users (hereinafter, referred to as "user data"), such as user account information. The CPU 301 refers to the global database 308a to perform user authentication. If the account information contained in the login request received in step S101 is found in the global database 308a, user authentication is successful. In contrast, if the account information contained in the received login request is not found in the global database 308a, user authentication is unsuccessful.

If user authentication is successful in step S102, the CPU 301 transmits an HTTP response (an example of a first response) indicating successful login as a response to the login request received in step S101, to the client apparatus 20A in step S103. At this time, the CPU 301 transmits an HTTP response containing an identification value of the relay apparatus 30A which is set in a predetermined area of the HTTP response. In this example, an HTTP response includes the Set-Cookie header used to store the identification information of the relay apparatus 30A in the client apparatus 20A as cookie information. Specifically, in this example, the CPU 301 generates an HTTP response which includes the Set-Cookie header containing "US" as a value for identifying a region in which the relay apparatus 30A is located.

The client apparatus 20A displays information on the display unit on the basis of the response received from the relay apparatus 30A. The user U1 performs an operation to access the service providing apparatus 10A, on the basis of the information displayed on the display unit of the client apparatus 20A. In step S104, the client apparatus 20A transmits, to the relay apparatus 30A, an access request (HTTP request) to access the service providing apparatus 10A, on the basis of the contents input by the user U1. This HTTP request includes the Cookie header which contains cookie information stored in the client apparatus 20A. In this example, this HTTP request includes the Cookie header which contains the value set in the Set-Cookie header of the response received in step S103, that is, the value "US" which is information indicating the region. In the Cookie header, ".example.com" is also set as the domain attribute.

Upon receipt of the access request from the client apparatus 20A, the CPU 301 of the relay apparatus 30A determines whether or not a refresh token (an example of first right information) and an access token (an example of second right information) of the user U1 corresponding to the received access request are stored in the databases 308 in step S105. A refresh token is information representing a right to access the service providing apparatus 10A and the access right is valid up until a first expiration date and time that is set. An access token is information representing a right to access the service providing apparatus 10A and the access right is valid up until a second expiration date and time that is earlier than the first expiration date and time. In this example, an access token and a refresh token are issued by the service providing apparatus 10A as data structures describing the access right. The service providing apparatus 10A determines whether or not to permit access by verifying the access token. In this example, expiration dates and times are preset for the access token and the refresh token. The access token or refresh token becomes invalid after its expiration date and time has reached. If the access token has expired, the service providing apparatus 10A reissues an access token when the refresh token is verified. In this example, the access token is stored in the local database 308b, whereas the refresh token is stored in the global database 308a. Hereinafter, the access token and the refresh token are simply referred to as "tokens" unless distinction between them is required.

FIG. 4 illustrates an example in which the tokens granted to the user U1 are not stored in the relay apparatus 30A. If it is determined in step S105 that the tokens are not stored in the databases 308 of the relay apparatus 30A, in step S106, the CPU 301 of the relay apparatus 30A transmits a response indicating a request to authorize a transfer of the access right, to the client apparatus 20A which is the transmission source of the access request. The value indicating the region contained in the Cookie header of this response includes "US". This response also contains a URL of a screen for inputting authorization information (i.e., a URL of a resource of the service providing apparatus 10 and hereinafter referred to as an "authorization URL") and a URL of a redirection destination (hereinafter, referred to as a "redirection URL") used in the case where a transfer of the access right is authorized.

The redirection URL is contained in the response in accordance with rules defined by the OAuth2 protocol. This redirection URL is a URL preregistered in the service providing apparatus 10A. In this example, "www.example.com" is registered in the service providing apparatus 10A as the redirection URL. Accordingly, the response transmitted by the relay apparatus 30A in step S106 also contains "www.example.com" as the redirection URL.

In an OAuth2-based access right transfer system, a URL (redirection URL) indicating a destination to which the access right is to be transferred is preregistered in a server apparatus as a redirection destination used in the case where the transfer is authorized by the user. The number of redirection URLs permitted to be registered changes depending on the type of the cloud service or the like. There are cloud services that permit registration of multiple redirection URLs, whereas there are cloud services that permit registration of only one redirection URL. The system 1 according to this exemplary embodiment includes the multiple relay apparatuses 30A, 30B, and 30C. In the case of a cloud service that permits registration of only one redirection URL, registration of the region URLs of these multiple relay apparatuses 30 to the cloud service (i.e., the service providing apparatus 10) is not permitted. Accordingly, in this example, instead of the region URLs, the global URL is registered as the redirection URL in the service providing apparatus 10.

In step S107, the CPU of the client apparatus 20A accesses the authorization URL contained in the response received in step S106, and makes a request to obtain an authorization screen. In step S108, the CPU of the service providing apparatus 10A transmits a response containing data representing the authorization screen to the client apparatus 20A. Based on the data contained in the received response, the CPU of the client apparatus 20A displays the authorization screen used to input authorization information on the display unit.

The user U1 then views the screen displayed on the display unit of the client apparatus 20A, and inputs authorization information used in authorization of a transfer of the access right by using the operation unit. In step S109, the CPU of the client apparatus 20A transmits the input authorization information to the service providing apparatus 10A. In step S110, the CPU of the service providing apparatus 10A determines whether or not to authorize the transfer of the access right on the basis of the authorization information received from the client apparatus 20A. If the transfer is authorized, the CPU of the service providing apparatus 10A transmits a response indicating "OK" to the relay apparatus 30A which is a request source that has made the request to authorize a transfer of the access right in step S106. The relay apparatus 30A then transmits the response received from the service providing apparatus 10A to the client apparatus 20A in step S111. This response contains the access token and the refresh token granted to the user U1. This response also contains, as a URL of the redirection destination, a URL preregistered as the redirection URL in the service providing apparatus 10A, that is, 'HYPERLINK "http://www.csb.com" www.example.com'.

In step S112, the CPU of the client apparatus 20A performs a process for redirection to the redirection URL contained in the response received in step S111, that is, redirection to "www.example.com". An HTTP request (access request) transmitted in step S112 includes the Cookie header which contains cookie information stored in the client apparatus 20A which is the transmission source of the access request. In this example, "US" is contained as the value indicating the region in the Cookie header of this HTTP request. This HTTP request also contains the access token and the refresh token received in step S111.

In step S112, the CPU of the client apparatus 20A makes an inquiry about an IP address corresponding to the redirection destination "www.example.com" to a domain name system (DNS) server (not illustrated) before transmitting the HTTP request for redirection. In this example, the DNS server used in the system 1 selects one of the multiple relay apparatuses 30 on the basis of a load condition of the communication network in the case where the URL indicating the redirection destination is the global URL, that is, the URL shared by the multiple relay apparatuses 30. The DNS server returns the IP address of the selected relay apparatus 30 to the client apparatus 20A. As described above, the relay apparatus 30 selected by the DNS server changes each time depending on the network load condition even if the global URL indicating the redirection destination remains unchanged. For example, when the client apparatus 20A performs redirection to "www.example.com", the IP address returned from the DNS server may be the IP address of the relay apparatus 30A at one timing and may be the IP address of the relay apparatus 30B at another timing.

As described above, in the case where the global URL is used as the redirection URL, the relay apparatus 30 selected as the redirection destination changes depending on the redirection timing. Thus, the client apparatus 20A is not allowed to select the relay apparatus 30 serving as the redirection destination. For convenience of explanation, the relay apparatus 30 selected as the redirection destination in the case where the global URL is used as the redirection URL is hereinafter referred to as a "relay apparatus 30Z".

The HTTP request transmitted in step S112 is received by the relay apparatus 30Z. As described above, the relay apparatus 30Z is a virtual relay apparatus, and is actually one of the relay apparatuses 30A, 30B, and 30C in this example.

The CPU 301 of the relay apparatus 30Z performs processing of steps S113 to S115 if the URL indicating the redirection destination contained in the received access request is the global URL (that is, if the URL is not the URL uniquely assigned to the resource of the relay apparatus 30Z). In step S113, the CPU 301 of the relay apparatus 30Z reads out a value of the information indicating the region set in the Cookie header of the received HTTP request (access request). In step S114, the CPU 301 generates an HTTP response in which a local URL corresponding to the read out value is set as the redirection URL. In this example, "US" is set as the information indicating the region in the Cookie header of the received HTTP request. Thus, the CPU 301 sets "us.example.com" as the redirection URL. Note that in the case where "EU" is set as the information indicating the region in the Cookie header, the CPU 301 sets "eu.example.com" as the redirection URL. In step S115, the CPU 301 transmits the HTTP response (an example of a third response) generated in step S114 to the client apparatus 20A.

In step S116, the CPU of the client apparatus 20A performs a process for redirection to the redirection URL contained in the response received in step S115, that is, redirection to "us.example.com". Because this redirection URL is the local URL, the relay apparatus 30 serving as the redirection destination is uniquely determined. The CPU of the client apparatus 20A makes an inquiry about an IP address corresponding to this redirection URL to the DNS server, and receives the IP address of the relay apparatus 30A from the DNS server. The CPU of the client apparatus 20A performs a process for redirection to the relay apparatus 30A. The HTTP request transmitted in step S116 contains the access token and the refresh token received from the service providing apparatus 10A in step S111. When this redirection process is performed, the HTTP request is redirected from "www.example.com" to the redirection URL "us.example.com" which uses the same domain, because ".example.com" is set as the domain attribute in the Cookie header.

The CPU 301 of the relay apparatus 30A receives the HTTP request (access request) from the client apparatus 20A. If the URL indicating the redirection destination contained in the received request is the URL uniquely assigned to the resource of the relay apparatus 30A, the CPU 301 of the relay apparatus 30A relays access to the service providing apparatus 10A by using the access token contained in the received access request. In this example, the redirection URL ("us.example.com") contained in the response received in step S116 is the URL uniquely assigned to the relay apparatus 30A. Thus, the CPU 301 of the relay apparatus 30A relays access to the service providing apparatus 10A. First, in step S117, the CPU 301 stores the access token contained in the received HTTP request in the local database 308b. In addition, in step S118, the CPU 301 stores the refresh token contained in the received HTTP request in the global database 308a. In step S119, the CPU 301 transmits an access request containing the access token to the service providing apparatus 10A.

In step S120, the CPU of the service providing apparatus 10A executes a service on the basis of the received access request. In step S121, the CPU of the service providing apparatus 10A transmits, to the relay apparatus 30A, data indicating the execution result of the requested service. In step S122, the CPU 301 of the relay apparatus 30A transmits the data received from the service providing apparatus 10A to the client apparatus 20.

As described above, in some cases, only one URL is permitted to be registered in the service providing apparatus 10A as the redirection URL that is used in the case where a transfer of the access right to the relay apparatus 30 is authorized in an OAuth2-based system. If one global URL "www.example.com" is preregistered in the service providing apparatus 10A, a relay apparatus serving as the redirection destination is selected by a DNS server as a result of the process for redirection to this global URL. Thus, the selected relay apparatus changes each time depending on various conditions, such as a network load. That is, although the user U1 has logged into the relay apparatus 30A (in step S101 of FIG. 4), the user U1 is in some cases redirected to the relay apparatus 30 (e.g., the relay apparatus 30B) different from the relay apparatus 30A in step S112.

However, in this exemplary embodiment, in the case where the client apparatus 20A performs a redirection process and the URL indicating the redirection destination contained in the redirection access request is a global URL, the value of the region information set in the Cookie header of the received access request is read out and the client apparatus 20A is instructed to perform redirection to the region URL corresponding to the read out value. In this way, access to the service providing apparatus 10A is made via the relay apparatus 30A which the user has logged into.

2-2. Second Exemplary Operation

Figure 5:
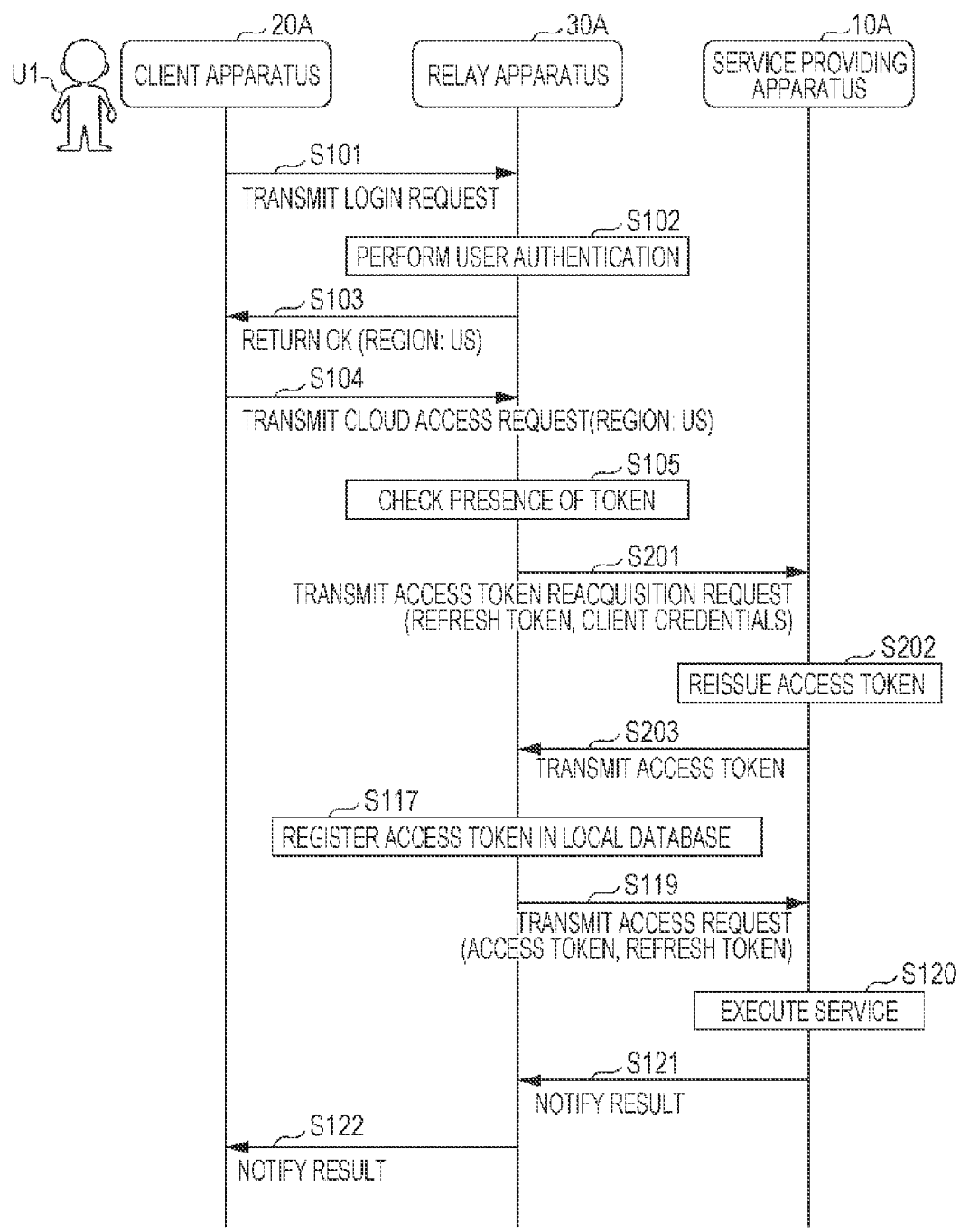
FIG. 5 is a sequence diagram illustrating another operation performed by the system.

FIG. 5 is a sequence diagram illustrating another operation performed by the system 1. This example illustrates an exemplary operation performed in the case where the access token and the refresh token are registered in the databases 308 of the relay apparatus 30A but the access token has expired when the user U1 attempts to access the service providing apparatus 10A via the relay apparatus 30A. Processing steps of FIG. 5 that are similar to those illustrated in FIG. 4 are denoted by the same references, and a description thereof will be omitted.

Upon receipt of an access request from the client apparatus 20A, the CPU 301 of the relay apparatus 30A determines whether or not an access token and a refresh token granted to the user U1 corresponding to the received access request are stored in the databases 308 and determines whether or not the expiration dates and times have reached in step S105 of FIG. 5. FIG. 5 illustrates the case where the access token and the refresh token are stored in the databases 308 but the access token has expired. Because the access token has expired, the CPU 301 transmits an access token reacquisition request to the service providing apparatus 10A in step S201. This reacquisition request contains the refresh token of the user U1 and client credentials. In this example, client credentials are authentication information previously issued to the relay apparatus 30A by the service providing apparatus 10A.

In step S202, the CPU of the service providing apparatus 10A reissues an access token to the user U1 on the basis of the refresh token and the client credentials contained in the received reacquisition request. In step S203, the CPU of the service providing apparatus 10A transmits the reissued access token to the relay apparatus 30A.

In step S117, the CPU 301 of the relay apparatus 30A stores the received access token in the local database 308b. In step S119, the CPU 301 transmits an access request to the service providing apparatus 10A using the reissued access token.

3. Exemplary Modifications

The above-described exemplary embodiment has described examples of the present invention. The exemplary embodiment may be modified in the following manner. In addition, exemplary modifications described below may be used in combination.

3-1. First Exemplary Modification

In the above-described exemplary embodiment, the CPU 301 of the relay apparatus 30A sets the identification value of the relay apparatus 30A in the Set-Cookie header of the HTTP response in step S103 of FIG. 4; however, the header in which the identification value of the relay apparatus 30A is set is not limited to this particular header. The identification value of the relay apparatus 30 may be set in another header of the HTTP response. In addition, in the above-described exemplary embodiment, an example of using the HTTP protocol to exchange data between apparatuses has been described; however, the protocol used to exchange data between apparatuses is not limited to the HTTP protocol.

3-2. Second Exemplary Modification

The system 1 according to the above-described exemplary embodiment includes the service providing apparatuses 10A, 10B, and 10C; the client apparatuses 20A, 20B, 20C, and 20D; and the relay apparatuses 30A, 30B, and 30C. The number of service providing apparatuses 10, the number of client apparatuses 20, and the number of relay apparatuses 30 are not limited to the numbers of these apparatuses included in the system 1.

3-3. Third Exemplary Modification

The program executed by the CPU 301 of the relay apparatus 30 in the above-described exemplary embodiment may be downloaded via a communication network, such as the Internet. Alternatively, this program may be provided after being stored on a computer-readable recording medium, such as a magnetic recording medium (such as a magnetic tape or magnetic disk), an optical recording medium (such as an optical disc), a magneto-optical recording medium, or a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one hardware processor; and
a memory storing computer executable instructions configured to cause the hardware processor to implement:
a first transmission unit that transmits a first response to a client apparatus in a case where the information processing apparatus receives a login request to log into the information processing apparatus from the client apparatus, the first response containing information identifying the information processing apparatus;
a second transmission unit that transmits, to the client apparatus, a second response to instruct the client apparatus to perform redirection to a uniform resource locator among one or a plurality of uniform resource locators that are preregistered in a server apparatus as destinations to which an access right is to be transferred, in a case where the server apparatus authorizes a transfer of the access right in response to a request from the client apparatus; and
a third transmission unit that reads out region information contained in an access request received from the client apparatus in response to the second response in a case where a uniform resource locator of a redirection destination contained in the received access request is not a uniform resource locator associated with the information processing apparatus and that transmits a third response containing an instruction for redirection to a uniform resource locator corresponding to the read out region information to the client apparatus which is a transmission source of the received access request, wherein
the third transmission unit is further configured to select, according to a network load condition, the region information from of a plurality of region information, and
each of the plurality of region information respectively corresponds to the redirection destination.

2. The information processing apparatus according to claim 1, wherein
the access request contains right information, and
the at least one hardware processor is further configured to implement:
a relay unit that relays access to the server apparatus by using the right information contained in the received access request in a case where the uniform resource locator of the redirection destination contained in the received access request is the uniform resource locator associated with the information processing apparatus.

3. The information processing apparatus according to claim 1, wherein
the first response contains cookie information identifying the information processing apparatus, and
the access request contains cookie information stored in the client apparatus which is the transmission source of the access request.

4. The information processing apparatus according to claim 2, wherein
the first response contains cookie information identifying the information processing apparatus, and
the access request contains cookie information stored in the client apparatus which is the transmission source of the access request.

5. The information processing apparatus according to claim 1, wherein
the access request contains first right information and second right information,
the first right information represents a right to access the server apparatus that is valid up until a first expiration date and time that is set,
the second right information represents a right to access the server apparatus that is valid up until a second expiration date and time earlier than the first expiration date and time, and
the at least one hardware processor is further configured to implement:
a first memory that stores data which is to be copied to a resource of another information processing apparatus;
a second memory that stores data; and
a memory controller that controls storage of the first right information contained in the received access request in the first memory and storage of the second right information contained in the access request in the second memory.

6. A system comprising:
a first information processing apparatus; and
a second information processing apparatus,
the first information processing apparatus including at least one first hardware processor and a first memory storing first computer executable instructions configured to cause the first hardware processor to implement:
a first transmission unit that transmits a first response to a client apparatus in a case where the first information processing apparatus receives a login request to log into the first information processing apparatus from the client apparatus, the first response containing information identifying the first information processing apparatus, and
the second information processing apparatus including at least one second hardware processor and a second memory storing second computer executable instructions configured to cause the second hardware processor to implement:
a second transmission unit that transmits, to the client apparatus, a second response to instruct the client apparatus to perform redirection to a uniform resource locator among one or a plurality of uniform resource locators that are preregistered in a server apparatus as destinations to which an access right is to be transferred, in a case where the server apparatus authorizes a transfer of the access right in response to a request from the client apparatus, and
a third transmission unit that reads out region information contained in an access request received from the client apparatus in response to the second response in a case where a uniform resource locator of a redirection destination contained in the received access request is not a uniform resource locator associated with the second information processing apparatus and that transmits a third response containing an instruction for redirection to a uniform resource locator corresponding to the read out region information to the client apparatus which is a transmission source of the received access request, wherein
the third transmission unit is further configured to select, according to a network load condition, the region information from of a plurality of region information, and
each of the plurality of region information respectively corresponds to the redirection destination.

7. An information processing method comprising:
- transmitting a first response to a client apparatus in a case where a login request to log into an information processing apparatus is received from the client apparatus, the first response containing information identifying the information processing apparatus;
- transmitting, to the client apparatus, a second response to instruct the client apparatus to perform redirection to a uniform resource locator among one or a plurality of uniform resource locators that are preregistered in a server apparatus as destinations to which an access right is to be transferred, in a case where the server apparatus authorizes a transfer of the access right in response to a request from the client apparatus;
- reading out region information contained in an access request received from the client apparatus in response to the second response in a case where a uniform resource locator of a redirection destination contained in the received access request is not a uniform resource locator associated with the information processing apparatus;
- selecting, according to a network load condition, the region information from of a plurality of region information; and
- transmitting a third response containing an instruction for redirection to a uniform resource locator corresponding to the read out region information to the client apparatus which is a transmission source of the received access request, wherein
- each of the plurality of region information respectively corresponds to the redirection destination.

8. A non-transitory computer readable medium storing a program causing a computer to execute a process for information processing, the process comprising:
- transmitting a first response to a client apparatus in a case where a login request to log into an information processing apparatus is received from the client apparatus, the first response containing information identifying the information processing apparatus;
- transmitting, to the client apparatus, a second response to instruct the client apparatus to perform redirection to a uniform resource locator among one or a plurality of uniform resource locators that are preregistered in a server apparatus as destinations to which an access right is to be transferred, in a case where the server apparatus authorizes a transfer of the access right in response to a request from the client apparatus;
- reading out region information contained in an access request received from the client apparatus in response to the second response in a case where a uniform resource locator of a redirection destination contained in the received access request is not a uniform resource locator associated with the information processing apparatus,
- selecting, according to a network load condition, the region information from of a plurality of region information; and
- transmitting a third response containing an instruction for redirection to a uniform resource locator corresponding to the read out region information to the client apparatus which is a transmission source of the received access request, wherein
- each of the plurality of region information respectively corresponds to the redirection destination.

9. The information processing apparatus according to claim 1, wherein the network load condition comprises a load condition of the network at a timing of the third transmission unit reading out the region information.

10. The information processing apparatus according to claim 9, wherein the third transmission unit is further configured to select, as the region information, a different one of the plurality of region information in response to a different load condition of the network at a different timing.

11. The information processing apparatus according to claim 10, wherein the plurality of region information respectively correspond to ones of different network addresses.

* * * * *